US008774136B2

(12) United States Patent
Gan et al.

(10) Patent No.: US 8,774,136 B2
(45) Date of Patent: Jul. 8, 2014

(54) METHODS AND ARRANGEMENTS FOR FEEDING BACK CHANNEL STATE INFORMATION

(75) Inventors: Jiansong Gan, Beijing (CN); Dennis Hui, Sunnyvale, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 439 days.

(21) Appl. No.: 13/145,223

(22) PCT Filed: Jan. 19, 2009

(86) PCT No.: PCT/SE2009/050047
§ 371 (c)(1),
(2), (4) Date: Jul. 19, 2011

(87) PCT Pub. No.: WO2010/082884
PCT Pub. Date: Jul. 22, 2010

(65) Prior Publication Data
US 2011/0274185 A1 Nov. 10, 2011

(51) Int. Cl.
H04L 27/26 (2006.01)

(52) U.S. Cl.
CPC .................................. H04L 27/2647 (2013.01)
USPC ........... 370/335; 370/329; 370/341; 370/464; 375/259; 375/260; 375/267; 375/296; 375/299; 375/346; 375/347

(58) Field of Classification Search
None
See application file for complete search history.

(56) References Cited

U.S. PATENT DOCUMENTS 7,676,007 B1 *   3/2010   Choi et al. ..................... 375/347
2009/0202014 A1 *   8/2009   Mujtaba et al. ............... 375/267

FOREIGN PATENT DOCUMENTS

WO       2010036159 A1    4/2010

OTHER PUBLICATIONS

Jindal, N. "Antenna Combining for the MIMO Downlink Channel." IEEE Transactions on Wireless Communications, vol. 7, No. 10, Oct. 2008.
Kountouris, M. et al. "Multiuser Diversity-Multiplexing Tradeoff in MIMO Broadcast Channels with Limited Feedback.".
Foschini, G., et al., "The Value of Coherent Base Station Coordination", 2005 Conference on Information Sciences and Systems, The John Hopkins University, Mar. 16, 2005, pp. 1-6.

(Continued)

Primary Examiner — Faruk Hamza
Assistant Examiner — Aixa A Guadalupe-Cruz
(74) Attorney, Agent, or Firm — Coats & Bennett, P.L.L.C.

(57) ABSTRACT

A method and an arrangement (600) in a user equipment (140) for quantizing channel state information in a coordinated multi-point transmission radio communication system (100). A dominant path is between the user equipment (140) and a first network node (110) and a non-dominant path is between the user equipment (140) and a second network node (120, 130). A ratio of the non-dominant path channel response, such as fast fading, to the dominant path channel response is quantized by using a codebook disclosed herein. A method and an arrangement (400) for generating a codebook by applying a log squared error distortion measure in an iterative algorithm. A method and an arrangement (900) in a user equipment (140) for allocating available bits among at least two quantized ratios in a channel state information feedback procedure. The bits are allocated by means of selecting (270) at least one codebook based on statistic properties, such as path gain, of the non-dominant path.

15 Claims, 7 Drawing Sheets

(56) References Cited

OTHER PUBLICATIONS

Linde, Y., et al., "An Algorithm for Vector Quantizer Design", IEEE Transactions on Communications, Jan. 1, 1980, pp. 84-95, vol. Com-28, No. 1, IEEE Communications Society.

Zhang, et al., "On the Achievable Throughput of MIMO Broadcast Channels with Finite Rate Feedback", IEEE International Conference on Communications, Jun. 24, 2007, pp. 2534-2539, IEEE.

Sharif, M., et al., "On the Capacity of MIMO Broadcast Channels With Partial Side Information", IEEE Transactions on Information Theory, Feb. 1, 2005, pp. 506-522, vol. 51, Issue: 2, IEEE Information Theory Society.

Jindal, N, "MIMO Broadcast Channels with Finite Rate Feedback", Global Telecommunications Conference, Nov. 28, 2005, pp. 1-6, vol. 3, IEEE.

Ericsson, "Lte-Advanced-Coordinated Multipoint transmission/reception", TSG-RAN WG1 #54, Jeju, Korea, Aug. 18, 2008, pp. 1-4, R1-083069, 3GPP.

Motorola, "LTE—A Multiple Point Coordination and its Classification", TSG-RAN WG1 #54, Jeju, Korea, Aug. 18, 2008, pp. 1-6, R1-083229, 3GPP.

Etri, "Coordinated multi-cell transmission for LTE-Advanced downlink", TSG-RAN WG1 #54, Jeju, Korea, Aug. 18, 2008, pp. 1-4, R1-082896, 3GPP.

3rd Generation Partnership Project, "3rd Generation Partnership Project; Technical Specification Group Radio Access Network; Further Advancements for E-UTRA Physical Layer Aspects (Release X)", Technical Report, 3GPP TR 36.814 V0.0.1, Sep. 1, 2008, pp. 1-9, 3GPP, France.

* cited by examiner

METHODS AND ARRANGEMENTS FOR FEEDING BACK CHANNEL STATE INFORMATION

TECHNICAL FIELD

The present invention relates to a method and an arrangement for generating a codebook and to methods and arrangements in a user equipment for quantizing and feeding back channel state information.

BACKGROUND

Recently, coordinated transmission from multiple radio network nodes, such as radio base stations, to at least one mobile terminal, or Coordinated Multi-Point (COMP) transmission, has been shown to provide performance gain as compared to without coordination. However, in the downlink, the coherent coordination needed for coordinated transmission requires Channel State Information (CSI) at the transmitter side, i.e. at the radio base stations. It is quite challenging to provide the transmitter side with channel station information, at least from a system-design point of view.

Also, in a Multi-User Multiple-Input Multiple-Output (MU-MIMO) system, in which capacity of the downlink channels, this kind of channel state information may be useful for improving capacity. Several solutions, as discussed in for example, "On the capacity of MIMO broadcast channels with partial side information", IEEE Trans. on Inform. Theory, vol. 51, no. 2, pp. 506-522, February 2005, by M. Sharif and B. Hassibi, and "MIMO broadcast channels with finite rate feedback", IEEE Trans. Information Theory, Vol. 52, No. 11, pp. 5045-5059, November 2006 by N. Jindal, for attacking this problem have been proposed. These solutions focus on systems, in which a base station antenna is placed at a fixed point. As a result, channel response between transmit and receive antennas may be assumed to be Independent and Identically Distributed (IID). Based on this assumption, random beam forming and random vector quantization have been proposed to reduce size expressed as number of bits of the CSI. The solutions presented in these documents may, however, not be applied to a coordinated multi-point transmission system. Hence, there is a need for a channel state information feedback procedure which may be applied to a coherent coordinated multi-point transmission system.

SUMMARY

An object of the present invention is to provide methods and arrangements for measurement and feedback of channel state information (channel response) in a coordinated multi-point transmission system.

According to an aspect of the invention, the object is achieved by a method in a user equipment in a coordinated multi-point transmission radio communication system, including a first radio network node and a second radio network node. The coordinated multi-point transmission radio communication system comprises a dominant path between said user equipment and said first radio network node and at least one first non-dominant path between said user equipment and the second radio network node. In a step the user equipment estimates a dominant path channel response based on a first set of channel estimation symbols received from the first radio network node, and estimates at least one first non-dominant path channel response based on a second set of channel estimation symbols received from the second radio network node. In a further step, the user equipment determines at least one ratio of said at least one first non-dominant path channel response to the dominant path channel response. Next, the user equipment combines real and imaginary parts of said determined at least one ratio into a vector, and quantizes the vector by means of a codebook generated by a method as disclosed herein.

According to another aspect of the invention, the object is achieved by an arrangement in a user equipment in a coordinated multi-point transmission radio communication system, including a first radio network node and a second radio network node. The coordinated multi-point transmission radio communication system comprises a dominant path between said user equipment and said first radio network node and at least one first non-dominant path between said user equipment and the second radio network node. The arrangement comprises a processing unit configured to estimate a dominant path channel response based on a first set of channel estimation symbols received from the first radio network node, to estimate at least one first non-dominant path channel response based on a second set of channel estimation symbols received from the second radio network node, to determine at least one ratio of said at least one first non-dominant path channel response to the dominant path channel response, to combine real and imaginary parts of said determined at least one ratio into a vector, and to quantize the vector by means of a codebook generated by an arrangement as disclosed herein.

According to a further aspect of the invention, the object is achieved by a method for generating reproduction coefficients of a codebook. The codebook is usable in a channel state information feedback procedure of a coordinated multi-point transmission radio communication system. In a step, an iterative algorithm is executed, while applying a distortion measure $d(x,\hat{x})=\ln(1+\|x-\hat{x}\|^2)$, where x is an input signal and $\hat{x}$ is a signal in response to the input signal. In this manner, the reproduction coefficients of the codebook are generated.

According to still another aspect of the invention, the object is achieved by an arrangement for generating reproduction coefficients of a codebook. The codebook is usable in a channel state information feedback procedure of a coordinated multi-point transmission radio communication system. The arrangement comprises a processing unit configured to execute an iterative algorithm, while applying a distortion measure of $d(x,\hat{x})=\ln(1+\|x-\hat{x}\|^2)$, where x is an input signal and $\hat{x}$ is a signal in response to the input signal. In this manner, the reproduction coefficients of the codebook are generated.

According to yet another aspect of the invention, the object is achieved by a method in a user equipment for allocating available feedback bits to at least two quantized ratios of at least one second and third non-dominant path channel responses to a dominant path channel response in a channel state information feedback procedure. A coordinated multi-point transmission radio communication system comprises the user equipment, a first radio network node, and at least a second and third radio network node. A dominant path is between the user equipment and the first radio network node and at least a second and third non-dominant path are between the user equipment and said at least second and third radio network nodes, respectively. In a step, the user equipment estimates the dominant path channel response based on a first set of channel estimation symbols received from the first radio network node. Then, the user equipment estimates said at least two non-dominant path channel responses based on a second and third set of channel estimation symbols received from said at least a second and third radio network nodes, respectively. In a further step, the user equipment determines at least two ratios of said at least two non-dominant path channel responses to the dominant path channel response. In another step, the user equipment selects at least two codebooks for quantization of said at least two ratios based on statistic properties, such as path gain, of said at least a second and third non-dominant path. In a still further step, the user equipment quantizes said at least two ratios by using said selected at least two codebooks. Then, the user equipment sends the quantized at least two ratios as channel state information feedback to a further network node comprised in the coordinated multi-point transmission radio communication system.

According to a still further aspect of the invention, the object is achieved by an arrangement in a user equipment for allocating available feedback bits among at least two quantized ratios of at least one second and third non-dominant path channel responses to a dominant path channel response in a channel state information feedback procedure. A coordinated multi-point transmission radio communication system comprises the user equipment, a first radio network node and at least a second and third radio network node. A dominant path is between the user equipment and the first radio network node and at least a second and third non-dominant path are between the user equipment and said at least second and third radio network nodes, respectively. The arrangement comprises a processing unit configured to estimate the dominant path channel response based on a first set of channel estimation symbols received from the first radio network node and to estimate said at least two non-dominant path channel responses based on a second and third set of channel estimation symbols received from said at least a second and third radio network nodes, respectively. The processing unit is further configured to determine at least two ratios of said at least two non-dominant path channel responses to the dominant path channel response and to select at least two codebooks for quantization of said at least two ratios based on statistic properties, such as path gain, of said at least a second and third non-dominant path. Moreover, the processing unit is further configured to quantize said at least two ratios by using said selected at least two codebooks. The arrangement further comprises a sending unit configured to send the quantized at least two ratios as channel state information feedback to a further network node comprised in the coordinated multipoint transmission radio communication system.

Since interference caused by the channel quantization error $\|x-\hat{x}\|^2$ impacts channel capacity as the logarithm of the channel quantization error, the use of the codebook, generated with the distortion measure of log squared error, reduces the quantizing (or quantization) error of the quantized ratio. Advantageously, performance of the coordinated multi-point transmission system, in terms of channel capacity, is significantly improved.

Advantageously, the present solution provides a method for generating a codebook, which enables use of a smaller number of bits for CSI feedback to the network node, while maintaining or decreasing the magnitude of the quantization error. Hence, the amount (that is number of bits) of channel state information feedback needed in a coherent coordinated multi-point downlink transmission is decreased. As a result, application of coordinated multi-point transmission is made more practical and/or simpler.

Since the selection of codebooks for allocating feedback bits (of the channel state information) is based on statistic properties, such as path gain, of the non-dominant paths, the quantization error of the channel state information fed back to the further network node may be reduced. In this manner, the feedback bits may be used more efficiently.

Moreover, the method for allocating available bits for channel state information among the non-dominant paths provides an effective way of sending the feedback bits of channel state information to the further network node. Hence, the application of the channel state information feedback scheme in a radio communication network is facilitated.

Further features of, and advantages with, the present invention will become apparent when studying the appended claims and the following description. Those skilled in the art realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figures 1, 2:
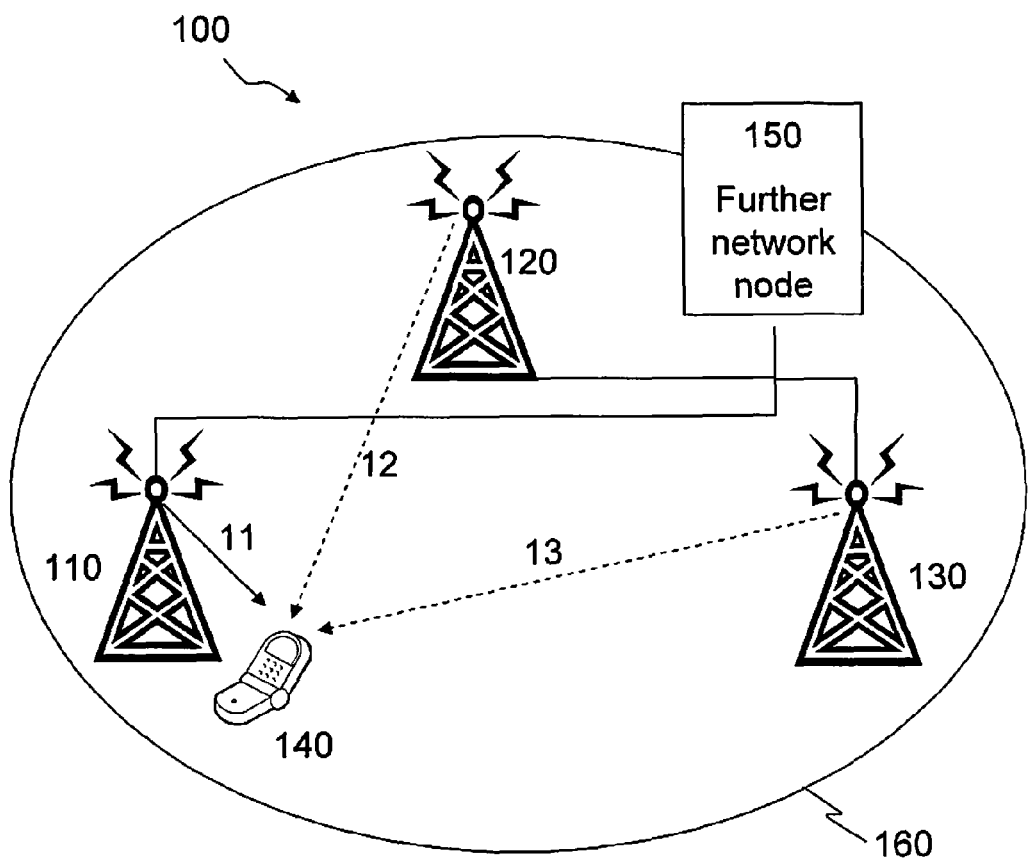
FIG. 1 shows a schematic overview of an exemplifying radio communication system.
FIG. 2 shows a schematic flow chart of an embodiment of the method for generating the codebook.

Throughout the following description similar reference numerals have been used to denote similar elements, parts, items or features, when applicable.

FIG. 1 shows a schematic overview of a coordinated multi-point radio transmission system 100. The system 100 comprises a core network node 150 and a user equipment 140. The user equipment 140 may be a mobile terminal, a communication device, a PDA or a computer equipped with appropriate radio transceivers, a mobile station or the like. The system 100 further comprises a first radio network node 110 and at least one second radio network node 120, 130. The first radio network node 110 and said at least one second radio network node 120, 130 may be radio base stations. The core network node 150 is arranged and configured to manage the first radio network node 110 and said at least one second radio network node 120, 130. The user equipment 140 is located closer to the first radio network node 110 than to said at least one second radio network node 120, 130. Hence, arrows 11, 12, 13 denote a dominant path, or channel, between the user equipment 140 and the first radio network node 110, a (first) non-dominant path, or channel, between the user equipment 140 and the second radio network node 120, and a (second) non-dominant path between the user equipment 140 and a third radio network node 130, respectively. A coordinated cell 160 is served by the first radio network node 110 and said at least one second radio network node 120, 130. In this example, there are two non-dominant paths.

When operating the system 100, a coordinated multi-point radio transmission is sent from the first and said at least one second radio network nodes 110, 120, 130 to the user equipment 140 (downlink), as indicated by arrows 11, 12 and 13. In order to provide coherent transmission to the user equipment 140 channel state information is needed at said at least one second radio network node 120, 130. Therefore, the user equipment 140 needs to feed back the channel response (or the channel state information) for the dominant and non-dominant paths to the second and third radio network nodes 120, 130. Hereinafter, this procedure may be referred to as a channel state information feedback procedure.

Moreover, when a signal x is transmitted from the second and third radio network nodes 120, 130, a received signal at the user equipment 140 may be assembled into a vector y, which may be expressed as:

$$y = Hx + n, \quad (1)$$

where $n \in C^{M \times 1}$ is the thermal noise at the user equipment 140 with distribution $CN(0, \sigma_n^2 I_M)$, and H is the channel matrix (or the channel response) between antennas on the second and third radio network nodes 120, 130 and on the user equipment 140. Taking both path gain (including shadowing) and fast fading into account, H may be written into the following form.

$$H = \begin{bmatrix} h_{1,1} & h_{1,2}, \Lambda, & h_{1,N} \\ M & O & M \\ h_{M,1}, & h_{M,2}, \Lambda, & h_{M,N} \end{bmatrix} \quad (2)$$

$$= \begin{bmatrix} \sqrt{\alpha_{1,1}} h_{w_{1,1}}, & \sqrt{\alpha_{1,2}} h_{w_{1,2}}, \Lambda, & \sqrt{\alpha_{1,N}} h_{w_{1,N}} \\ M & O & M \\ \sqrt{\alpha_{M,1}} h_{w_{M,1}}, & \sqrt{\alpha_{M,2}} h_{w_{M,2}}, \Lambda, & \sqrt{\alpha_{M,N}} h_{w_{M,N}} \end{bmatrix},$$

where $h_{W_{m,n}}$ (n=1, 2, $\Lambda$, N, m=1, 2, $\Lambda$, M) are IID, zero-mean, unit-variance, circularly-symmetric complex Gaussian variables, representing the fast fading, and $\alpha_{m,n}$ is the path gain between the n:th radio network node, such as a base station, and the m:th radio network node, such as a mobile terminal.

In order to minimize size (number of bits) of the ratios fed back to the core network node the ratios of non-dominant path to dominant paths need to be quantized. According to the present solution, the ratios are quantized by means arranging real and imaginary parts of the ratios into a vector, which in turn is quantized according to a vector quantizing method using the log squared error as measure of quantization error as described below. Thus, a codebook for the vector quantizing method is required. Advantageously, the codebook provides means for fast and simple implementation of the quantizing of the ratios.

In FIG. 2, there is shown a schematic flow chart of an embodiment of the method for generating at least one codebook for at least one channel response ratio of at least one non-dominant path to the dominant path. As shown in FIG. 1, each user may observe more than one non-dominant path. Hence, more than one channel response ratio is normally needed to be fed back. The codebook is usable in a channel state information feedback procedure of a coordinated multi-point transmission radio communication system. The method for generating reproduction coefficients of the codebook may comprise a step of executing 30 an iterative algorithm, while applying 20 a distortion measure of $d(x,\hat{x}) = \ln(1 + \|x - \hat{x}\|^2)$, where x is an input signal and $\hat{x}$ is a signal in response to the input signal. In this manner, the reproduction coefficients of the codebook are generated.

In some embodiments of the method for generating a codebook, the iterative algorithm is a Linde-Buzo-Gray algorithm, a Lloyd Max algorithm or the like.

In some embodiments of the method for generating a codebook, the generated reproduction coefficients comprise a predetermined number of bits for different codebooks.

Figure 3:
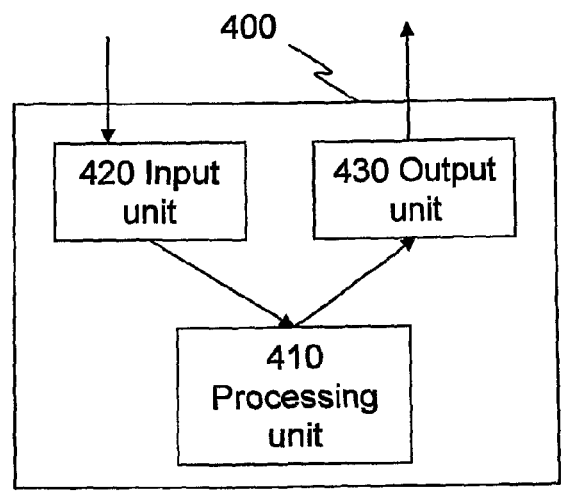
FIG. 3 shows a schematic block diagram of an embodiment of the arrangement for generating the codebook.

Referring to FIG. 3, there is shown a schematic block diagram of an embodiment of the arrangement 400 for generating the codebook. The codebook is usable in a channel state information feedback procedure of a coordinated multi-point transmission radio communication system. The arrangement 400 for generating reproduction coefficients of a codebook may comprise a processing unit 410 configured to execute 30 an iterative algorithm, while applying 20 a distortion measure of $d(x,\hat{x}) = \ln(1 + \|x - \hat{x}\|^2)$, where x is an input signal and $\hat{x}$ is a signal in response to the input signal. Thereby, the reproduction coefficients of the codebook are generated. Optionally, the arrangement comprises an input unit 420 for receiving the input signal and the signal in response to the input signal and an output unit 430 for outputting the reproduction coefficients.

In some embodiments of the arrangement 400 for generating a codebook, the iterative algorithm is a Linde-Buzo-Gray algorithm, a Lloyd Max algorithm or the like.

In some embodiments of the arrangement 400 for generating a codebook, the generated reproduction coefficients comprise a predetermined number of bits for different codebooks.

The ratios of the channel responses of the non-dominant paths to that of the dominant path are needed to be fed back. If $h_{i,j}$ is the channel response of dominant path of user i, the ratio for the j:th antenna may be expressed as $$\tilde{h}_{i,j} = \frac{h_{i,j}}{h_{i,i}} = \sqrt{\frac{\alpha_{i,j}}{\alpha_{i,i}}} \frac{h_{w_{i,j}}}{h_{w_{i,i}}}, \quad (3)$$

Since the path gain $$\sqrt{\frac{\alpha_{i,j}}{\alpha_{i,i}}}$$

may be fed back with a relatively low frequency or may be estimated based on the uplink signal as the uplink is reciprocal, only the fast fading part (or factor), $$r_w = \frac{h_{w_{i,j}}}{h_{w_{i,i}}}$$

needs to be fed back fast.

In the proposed method, the real part and the imaginary part of the fast fading part $r_w$ is assembled into a two-dimensional real vector, then vector quantization is introduced to quantize the fast fading part, $r_w$. As the distribution of the fast fading part, $r_w$, is known, an LBG algorithm, as discussed in "An algorithm for vector quantizer design", published in IEEE Trans. Commun., vol. COM-28, no. 1 pp. 84-95, January 1980 by Y. Linde, A. Buzo, R. M. Gray, may be applied to find the codebook. The algorithm requires a distortion measure $d(x,\hat{x})$ to be defined. According to the present solution, a distortion measure, Log Squared Error (LSE), is proposed:

$$d(x,\hat{x}) = \ln(1 + \|x - \hat{x}\|^2), \quad (5)$$

where an input vector is denoted by x and a reproduction is denoted by $\hat{x}$. Vector quantization with such a distortion measure is named VQLSE. Since interference caused by the channel quantization error $\|x - \hat{x}\|^2$ impacts channel capacity as the logarithm of the channel quantization error, the log squared error distortion measure leads to better system performance, e.g. in terms of channel capacity. Although the description refers to the natural logarithm $\ln(\bullet)$ as one example embodiment for the distortion measure, this is not intended to exclude other logarithmic functions $\log(\bullet)$ with appropriate base.

With the log squared error distortion measure, an embodiment of the method for generating an n-bit codebook may comprise the following steps.

In an initialization step, a distortion threshold $\epsilon > 0$, a training sequence (realizations of $r_w$) $\{t_j, j=1, 2, \ldots, J\}$ and a (n−1)-bit codebook $\hat{A}$ are given. Further, m is set to zero, $D_{-1} = \infty$, each element $\hat{A}$ is split into two such that $\hat{A}_0 = \{(1+\epsilon)\hat{A}, (1-\epsilon)\hat{A}\}$.

In a distortion step, $\hat{A}_m = \{y_i, i=1, 2, 3, \Lambda, 2^n\}$ is given. Further, the minimum-distortion partition $p(\hat{A}_m) = \{S_i, i=1, 2, 3, \Lambda, 2^n\}$ of the training sequence: $t_j \in S_i$ if $d(t_j, y_i) \leq d(t_j, y_l)$ for all l is to be found. Then, the average distortion is computed as $$D_m = D(\{\hat{A}_m, p(\hat{A}_m)\}) = J^{-1} \sum_{j=1}^{J} \min_{y \in A_m} d(t_j, y)$$

In a further step, if $(D_{m-1} - D_m)/D_m \leq \epsilon$, then $\hat{A}_m$ is the final codebook and no further steps are performed. Otherwise continue to the next step.

In a following step, the optimal reproduction alphabet $\hat{x}(p(\hat{A}_m)) = \{\hat{x}(S_i); i=1, 2, 3, \Lambda, 2^n\}$ for $p(\hat{A}_m)$ is found, such that $$\sum_{t \in S_i} d(t, \hat{x}(S_i))$$

is minimized.

In a yet further step, $\hat{A}_{m+1} = \hat{x}(p(\hat{A}_m))$ is set and m is replaced by m+1.

In a still further step, the procedure continues at the distortion step above.

According to the steps above, an (n−1)-bit codebook is needed to find an n-bit codebook. This recursive process continues until n equals to 0, where the codebook generation may be expressed as follow.

Given a training sequence $\{t_j, j=1, 2, \ldots, J\}$, the codebook is $\hat{A} = \{y\}$, where y is a vector such that $$J^{-1} \sum_{j=1}^{J} d(t_j, y)$$

is minimized.

In this manner, codebooks for a number of bit-values, such as 1, 2, 3, 4, 5, etc., are generated. The codebooks may, preferably, be used in conjunction with the bit allocation method described below.

Figure 4:
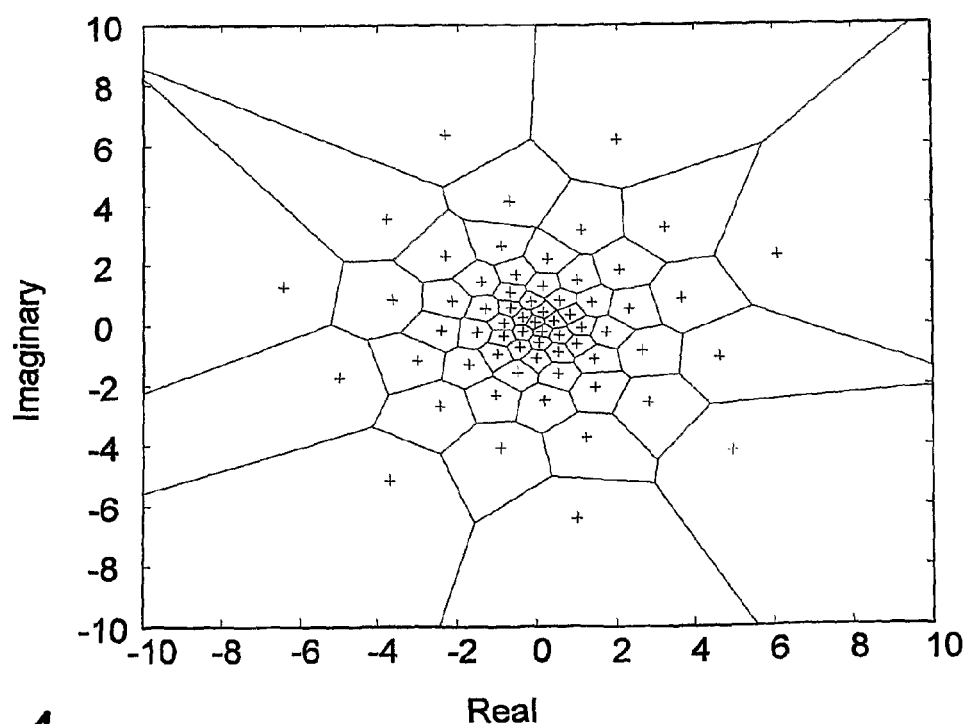
FIG. 4 shows an exemplifying 6-bit codebook with VQLSE.

With reference to FIG. 4, there is illustrated an exemplifying 6-bit codebook with VQLSE. From the FIG. 4, it may be noted that the generated 6-bit codebook has a higher density (smaller quantization areas) in a central region. Advantageously, the codebook may provide more accurate reproduction coefficients, or quantizing coefficients, for those ratios that appear more often that other ratios.

Figure 5:
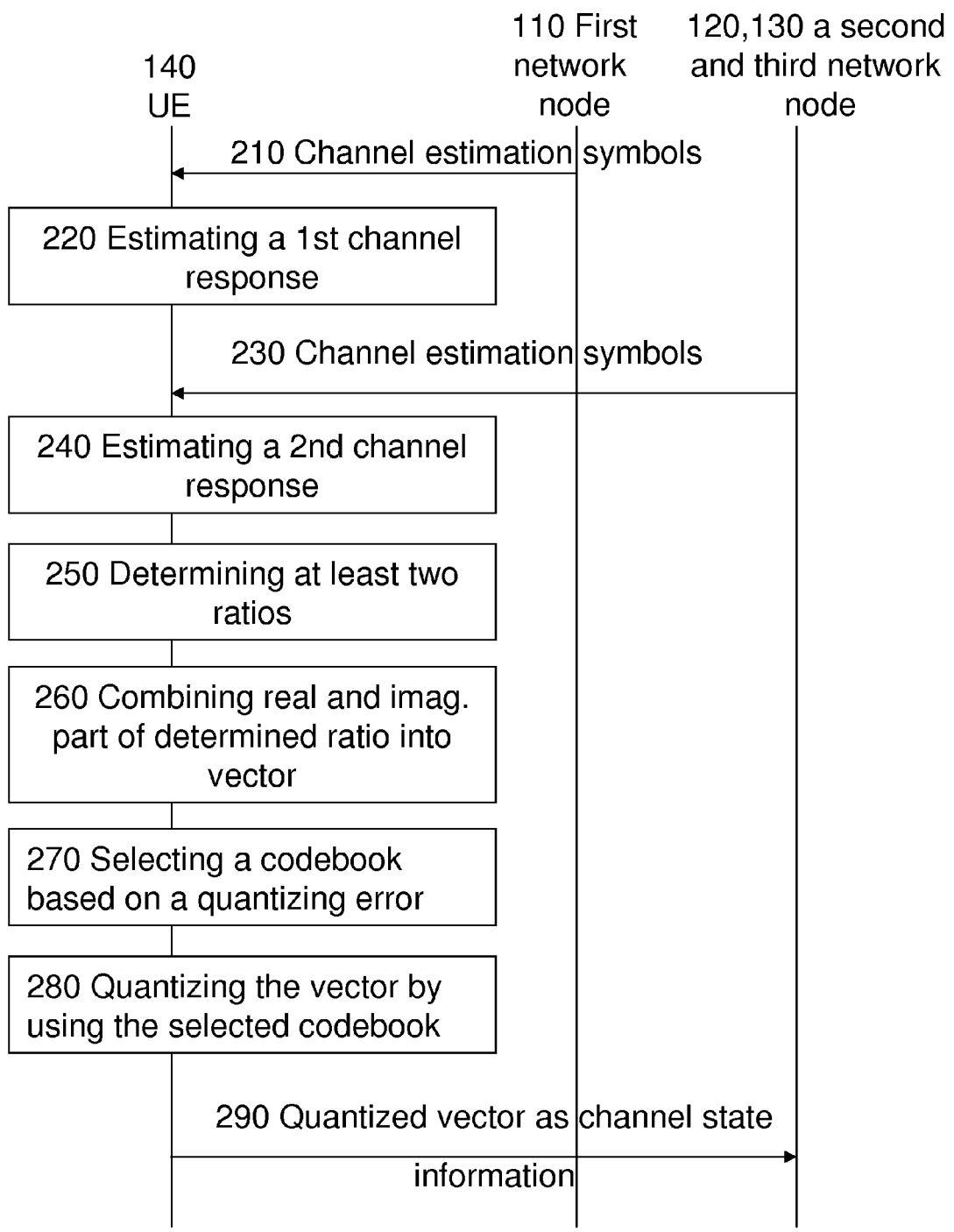
FIG. 5 shows a schematic, combined signalling and flow chart of an exemplifying method in the radio communication system according to FIG. 1.

Turning to FIG. 5, there is shown a schematic, combined signalling and flow chart of an exemplifying method in the radio communication system according to FIG. 1. The following steps may be performed.

210 In a step 210, a first set of channel estimation symbols (or pilot symbols) are sent from the first radio network node 110 to the user equipment 140.

220 In a step 220, the user equipment 140 estimates the dominant path channel response based on the first set of channel estimation symbols. The channel response may comprise fast fading and, optionally, path gain. In general, the magnitude of the fast fading changes faster than the magnitude of the path gain. Hence, it is preferred to feed back the fast fading. Path gain may be fed back more seldom than fast fading or not at all. When path gain is not fed back at all, the path gain may be obtained from the uplink signal at the first and said at least one second radio network nodes 120, 130, since the path gain of the uplink and the path gain of the downlink are reciprocal.

230 In a step 230, a second and a third set of channel estimation symbols (or pilot symbols) are sent from the second and third radio network nodes 120, 130 to the user equipment 140.

240 In a step 240, the user equipment 140 estimates at least two non-dominant path channel responses based on the second and third sets of channel estimation symbols.

250 In a step 250, the user equipment 140 determines at least two ratios of said at least two non-dominant path channel responses to the dominant path channel response. It is sufficient to only feed back the ratio of channel response on the non-dominant path to channel response on the dominant path, so as to perform some beam forming operation at the transmitter

260 In a step 260, the user equipment 140 combines real and imaginary parts of the determined at least two ratios into at least two vectors.

270 In a step 270, the user equipment 140 selects at least one codebook for quantization of said at least one vector such that the total quantizing error of said at least two vectors is reduced. See further details below.

280 In a step 280, the user equipment 140 quantizes said at least two vectors by using the selected at least two codebooks.

290 In a step 290, the quantized vector is sent from the user equipment 140 to the further network node 150, via said at least one first radio network node 110, 120, 130, as channel state information feedback on an uplink channel.

As an example of bit allocation, it may be assumed that two vectors need to be quantized, i.e. a first and a second non-dominant path exist. Next, it needs to be determined or, optionally, it has been determined in advance, what codebook to use for the quantization of the vectors. Expressed differently, codebooks need to be selected for the specific conditions. In this example, it has been found that the (total) quantizing error is minimized for a 3-bit codebook for the channel response of the first non-dominant path and a 5-bit codebook for the channel response of the second non-dominant path. Consequently, the 3-bit codebook should be used to quantize the vector corresponding to the ratio of the first non-dominant path channel response to the dominant path channel response, and the 5-bit codebook should be used to quantize the vector corresponding to the ratio of the second non-dominant path channel response to the dominant path channel response. After quantizing the vectors, the 8 bits are sent to the core network node, via the first radio network node.

Furthermore, it may be noted that the bit allocation pattern, i.e. what codebook(s) to use for what non-dominant path, needs to be updated more slowly than the channel response ratios, in particular fast fading.

Figure 6:
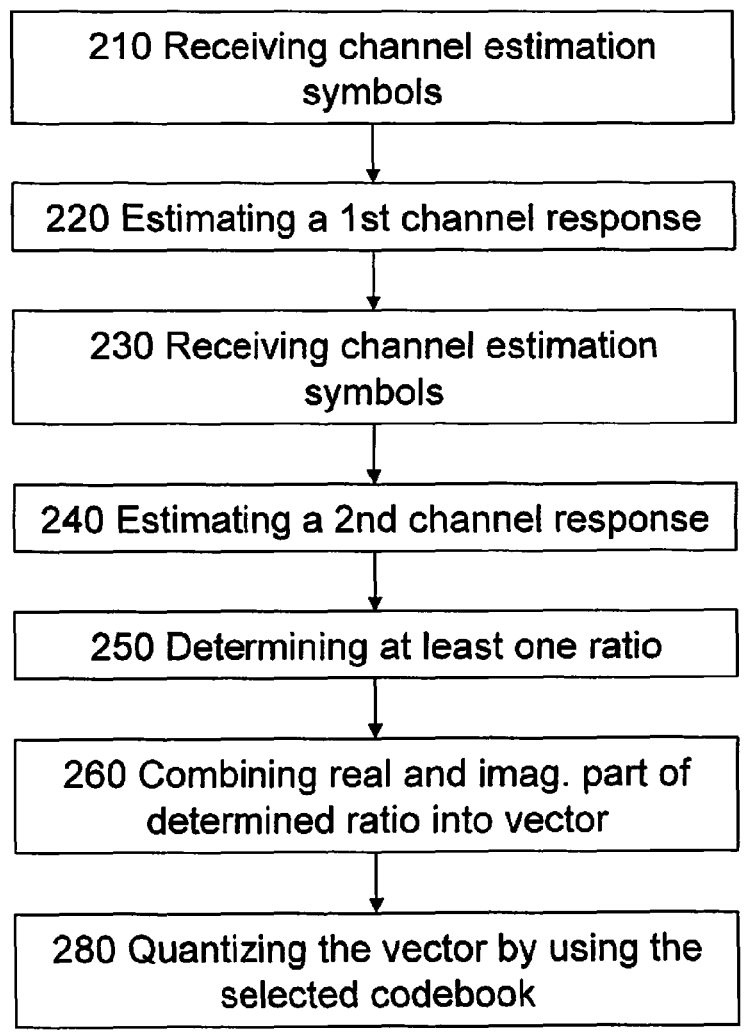
FIG. 6 shows a schematic flow chart of an embodiment of the method in the user equipment for sending CSI feedback by using the proposed codebook.

In FIG. 6, there is shown a schematic flow chart of an embodiment of the method in the user equipment 140 for quantizing at least one ratio of at least one non-dominant path channel response to a dominant path channel response for use in a channel state information feedback procedure. A coordinated multi-point transmission radio communication system 100 comprises the user equipment 140, a first radio network node 110 and at least one second radio network node 120, 130. Furthermore, the coordinate multi-point transmission radio communication system 100 includes a dominant path between said user equipment 140 and said first radio network node 110 and at least one first non-dominant path between said user equipment 140 and the second radio network node 120.

The dominant path is between the user equipment 140 and the first radio network node 110 and said at least one non-dominant path is between the user equipment 140 and said at least one second radio network node 120, 130. The following steps may be performed.

210 In an optional step 210, the user equipment 140 receives a first set of channel estimation symbols from the first radio network node 110.

220 In a step 220, the user equipment 140 estimates the dominant path channel response based on the first set of channel estimation symbols received from the first radio network node 110.

230 In an optional step 230, the user equipment 140 receives a second set of channel estimation symbols from said at least one second radio network node 120, 130.

240 In a step 240, the user equipment 140 estimates said at least one non-dominant path channel response based on the second set of channel estimation symbols received from the second radio network node 120.

250 In a step 250, the user equipment determines at least one ratio of said at least one non-dominant path channel response to the dominant path channel response.

260 In a step 260, the user equipment combines real and imaginary parts of said determined at least one ratio into a vector.

280 In a step 280, the user equipment quantizes the vector by means of a codebook generated by the method for generating a codebook as disclosed within this application.

In some embodiment of the method in the user equipment 140, the coordinated multi-point transmission radio communication system 100 further includes a third radio network node 130 and further comprises a second non-dominant path between the user equipment 140 and the third radio network node 130. The following steps may be performed.

240 In a step 240, the user equipment 140 estimates a second non-dominant path channel response based on a third set of channel estimation symbols received from the third radio network node 130,

250 In a step 250, the user equipment 140 determines at least two ratios of said at least one first non-dominant path channel response and the second non-dominant path channel response to the dominant path channel response.

270 In a step 270, the user equipment 140 selects at least two codebooks for quantization of said at least two ratios based on statistic properties, such as path gain, of said at least one second and third non-dominant path. In this manner, the number of available bits for sending feedback information is distributed between, or allocated to/among, the quantized ratios under the condition that the total quantization error for all quantized ratios is minimized or at least fairly low.

In some embodiment of the method in the user equipment 140, the channel response comprises fast fading and/or path gain.

In some embodiment of the method in the user equipment 140, the method further comprises a step of sending 290 the quantized vector as channel state information feedback to a further network node 150 comprised in the coordinated multi-point transmission radio communication system 100. Optionally, the sending of the quantized vector as channel state information is sent on an uplink channel.

Figure 7:
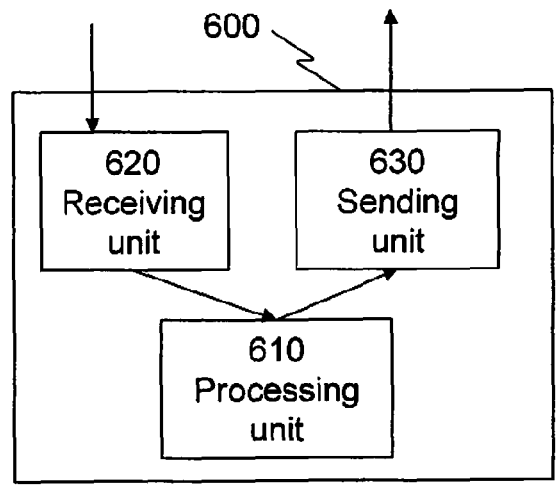
FIG. 7 shows a schematic block diagram of an embodiment of the arrangement in user equipment for sending CSI feedback by using the proposed codebook.

FIG. 7 shows a schematic block diagram of an embodiment of the arrangement 600 in a user equipment 14 in a coordinated multi-point transmission radio communication system 100, including a first radio network node 110 and a second radio network node 120. The coordinated multi-point transmission radio communication system 100 comprises a dominant path between said user equipment 140 and said first radio network node 110 and at least one first non-dominant path between said user equipment 140 and the second radio network node 120. The arrangement 600 comprises a processing unit 610 configured to estimate 220 a dominant path channel response based on a first set of channel estimation symbols received from the first radio network node 110, to estimate 240 at least one first non-dominant path channel response based on a second set of channel estimation symbols received from the second radio network node 120, to determine 250 at least one ratio of said at least one first non-dominant path channel response to the dominant path channel response, to combine 260 real and imaginary parts of said determined at least one ratio into a vector, and to quantize 280 the vector by means of a codebook generated by the arrangement as disclosed herein. Optionally, the arrangement comprises a receiving unit 620 and a sending unit 630.

In some embodiment of the arrangement 600 in the user equipment 140, the coordinated multi-point transmission radio communication system (100) further includes a third radio network node (130) and further comprises a second non-dominant path between the user equipment (140) and the third radio network node (130). The processing unit 610 may further be configured to estimate 240 a second non-dominant path channel response based on a third set of channel estimation symbols received from the third radio network node 130, to determine 250 at least two ratios of said at least one first non-dominant path channel response and the second non-dominant path channel response to the dominant path channel response, and to select 270 at least two codebooks for quantization of said at least two ratios based on statistic properties, such as path gain, of said at least one second and third non-dominant path.

In some embodiment of the arrangement 600 in the user equipment 140, the channel response comprises fast fading and/or path gain.

In some embodiment of the arrangement 600 in the user equipment 140, the arrangement further comprises a sending unit configured to send 290 the quantized vector as channel state information feedback to a further network node 150, such as a core network node, an advanced eNodeB or the like, comprised in the coordinated multi-point transmission radio communication system 100.

Figure 8:
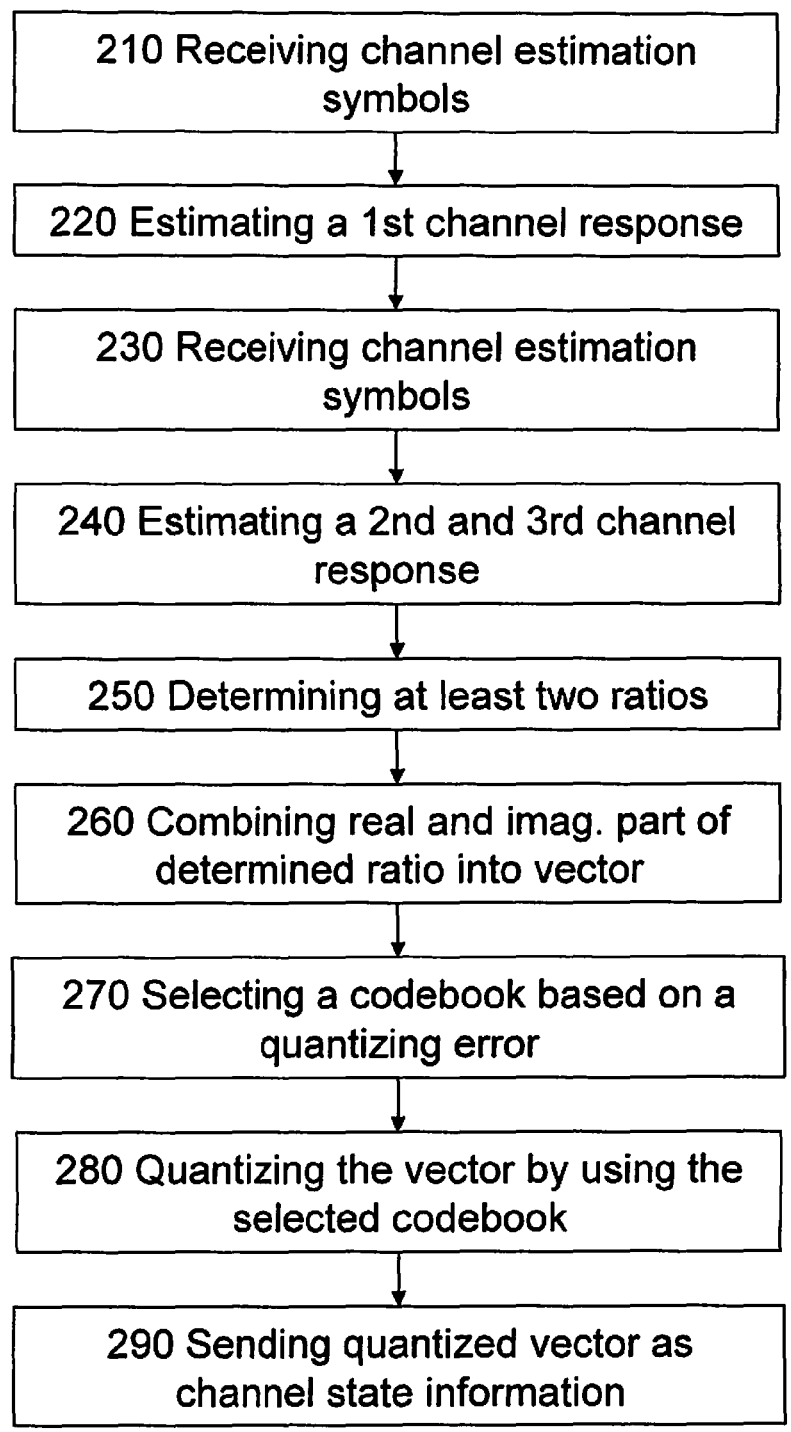
FIG. 8 shows a schematic flow chart of an embodiment of the method in the user equipment for allocating CSI feedback.

In FIG. 8, there is shown a schematic flow chart of an embodiment of the method in a user equipment 140 for allocating available feedback bits to (or among) at least two quantized ratios of at least one second and third non-dominant path channel responses to a dominant path channel response in a channel state information feedback procedure. Expressed differently, an embodiment of the method in the user equipment 140 for distributing available feedback bits between at least two quantized ratios is provided. A coordinated multi-point transmission radio communication system (100) comprises the user equipment (140), a first radio network node (110), and at least a second and third radio network node (120, 130). A dominant path is between the user equipment (140) and the first radio network node (110) and at least a second and third non-dominant path are between the user equipment (140) and said at least second and third radio network nodes (120, 130), respectively. Since there are at least two non-dominant paths, the selection of different codebooks for different non-dominants paths improves efficiency of the feedback transmission. The following steps may be performed.

210 In an optional step 210, the user equipment 140 receives a first set of channel estimation symbols from the first radio network node 110.

220 In a step 220, the user equipment 140 estimates the dominant path channel response based on the first set of channel estimation symbols received from the first radio network node 110.

230 In an optional step 230, the user equipment 140 receives a second and third set of channel estimation symbols from said at least one second and third radio network nodes 120, 130.

240 In a step 240, the user equipment 140 estimates said at least two non-dominant path channel responses based on the second and third set of channel estimation symbols received from said at least a second and third radio network node 120, 130, respectively.

250 In a step 250, the user equipment 140 determines at least two ratio of said at least two non-dominant path channel responses to the dominant path channel response.

260 In an optional step 260, the user equipment 140 combines real and imaginary parts of the determined at least one ratio into at least one vector.

270 In a step 270, the user equipment 140 selects at least two codebooks for quantization of said at least two ratios, or optionally vectors, based on statistic properties, such as path gain, of said at least a second and third non-dominant path.

280 In a step 280, the user equipment 140 quantizes said at least two ratios, or optionally vectors, by using said selected at least two codebooks.

290 In a step 290, the user equipment 140 sends said quantized at least two ratios, or optionally vectors, as channel state information feedback to a further network node 150 comprised in the coordinated multi-point transmission radio communication system 100. Optionally, the quantized ratios are sent on an uplink channel.

In some embodiment of the method in the user equipment 140, the quantizing error is based on statistic properties, such as path gain, of said at least one non-dominant path over a period of time. For example, the bit allocation pattern may need to be updated every $5^{th}$ transmission time interval (TTI) or less, whereas the fast fading needs to be fed back to the further network node every TTI.

In some embodiment of the method in the user equipment 140, information about the selected said at least one codebook is sent to the further network node 150.

In some embodiment of the method in the user equipment 140, the selected codebook is generated by the method for generating reproduction coefficients as disclosed herein.

In some embodiment of the method in the user equipment 140, the method further comprises a step of sending at least one index, indicating the selected at least one codebook, to the further network node 150.

In some embodiment of the method in the user equipment 140, the step of sending at least one index is performed less frequent than the step of sending the quantized at least one ratio.

Figure 9:
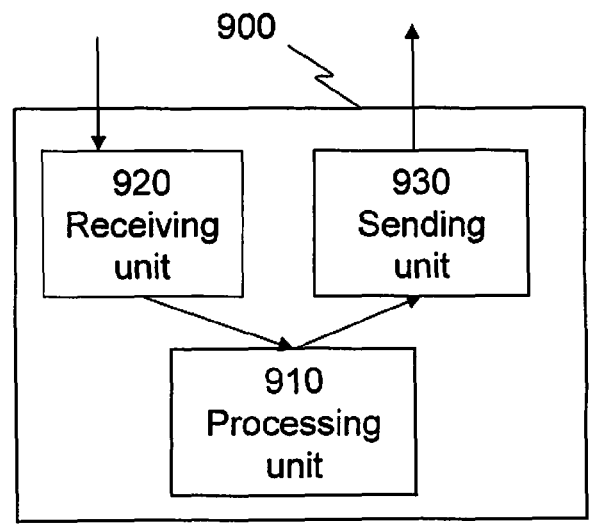
FIG. 9 shows a schematic block diagram of an embodiment of the arrangement in the user equipment for allocating CSI feedback.

Moreover, in FIG. 9, there is shown a schematic block diagram of an embodiment of the arrangement 900 in the user equipment 140 for allocating available feedback bits to (or among) at least two quantized ratios of at least one second and third non-dominant path channel responses to a dominant path channel response in a channel state information feedback procedure. A coordinated multi-point transmission radio communication system 100 comprises the user equipment 140, a first radio network node 110, and at least a second and third radio network node 120, 130. A dominant path is between the user equipment 140 and the first radio network node 110 and at least a second and third non-dominant path are between the user equipment 140 and said at least second and third radio network nodes 120, 130, respectively. The arrangement 900 comprises a processing unit 910 configured to estimate 220 the dominant path channel response based on a first set of channel estimation symbols received from the first radio network node 110 and to estimate 240 said at least two non-dominant path channel responses based on a second and third set of channel estimation symbols received from said at least a second and third radio network nodes 120, 130, respectively. The processing unit 910 is further configured to determine 250 at least two ratios of said at least two non-dominant path channel responses to the dominant path channel response and to select 270 at least two codebooks for quantization of said at least two ratios based on statistic properties, such as path gain, of said at least a second and third non-dominant path. Moreover, the processing unit 910 further is configured to quantize 280 said at least two ratios by using said selected at least two codebooks. The arrangement 900 further comprises a sending unit 930 configured to send 290 the quantized at least two ratios as channel state information feedback to a further network node 150 comprised in the coordinated multi-point transmission radio communication system 100. Optionally, the arrangement 900 further comprises a receiving unit 920.

In some embodiment of the arrangement 900 in the user equipment 140, the quantizing error is based on statistic properties, such as path gain, of said at least one non-dominant path over a period of time.

In some embodiment of the arrangement 900 in the user equipment 140, information about the selected said at least one codebook is sent to the further network node 150.

In some embodiment of the arrangement 900 in the user equipment 140, the selected codebook is generated by the arrangement for generating reproduction coefficients as disclosed herein.

In some embodiment of the arrangement 900 in the user equipment 140, the arrangement further comprises a sending unit 930 configured to send at least one index, indicating the selected at least one codebook, to the further network node 150.

In some embodiment of the arrangement 900 in the user equipment 140, the sending unit 930 is further configured to send said at least one index less frequent than the quantized at least one ratio.

When the quantized ratios have been determined the quantized ratios need to be sent to the core network node (via, for example, the third radio network node). Generally, there are N−1 non-dominant paths, or channels, on which the quantized ratios may be sent on.

In a CoMP system, as illustrated in FIG. 1, a first radio network node 120 observes one dominant path and N−1 non-dominant paths. Assume that the first radio network node 120 may send $R_{total}$ bits as feedback to the core network. The $R_{total}$ bits should be allocated efficiently among the N−1 non-dominant paths. The performance is measured by the total quantization error.

Let the ratios of the N−1 non-dominant paths to the dominant path be $\tilde{h}_1, \tilde{h}_2, \Lambda, \tilde{h}_{N-1}$, where $\tilde{h}_n = \sqrt{\tilde{\alpha}_n} r_{wn}$ as defined in (3). The bit-allocation problem is then solved by finding $R=\{R_1, R_2, \Lambda, R_{N-1}\}$ with $$\sum_{n=1}^{N-1} R_n = R_{total},$$

such that the total quantization error $$D(R) = \sum_{n=1}^{N-1} D_n(R_n)$$

is minimized, where $D_n(R_n)$ is the quantization error for the n:th non-dominant path, defined as $D_n(R_n) = E[\|\tilde{h}_n - Q_{R_n}(\tilde{h}_n)\|^2] = \tilde{\alpha}_n \cdot E[\|r_{wn} - Q_{R_n}(r_{wn})\|^2]$, where $Q_{R_n}(\tilde{h}_n)$ is the quantized value of the ratio of the n:th non-dominant path to the dominant path.

Figure 10:
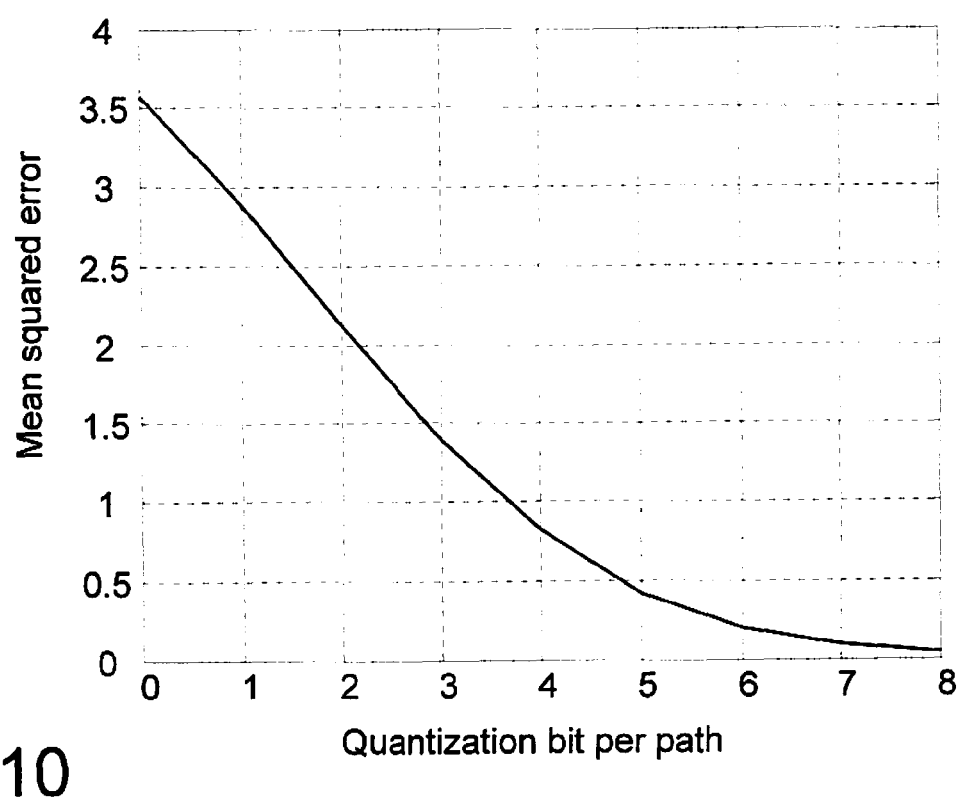
FIG. 10 shows a diagram, in which mean squared error is plotted as a function of quantization bits.

With the codebook generated according to the method described above, the quantization error of the fast fading part $E[\|r_{wm} - Q_{R_n}(r_{wn})\|^2]$ is a function of $R_n$ as shown in FIG. 10. Thus, $D_n(R_n)$ may be obtained (by a multiply of $\tilde{\alpha}_n$) based on the function in FIG. 10. As can be seen from FIG. 6, $D_n(R_n)$ is a convex function of $R_n$. As a consequence, allocating one bit at a time according to the following steps will give a solution.

In an initialization step, the following variables are initialized according to the following $R_1=R_2=\Lambda=R_N=0$, $R_{allocated}=0$.

In a next step, a path (for example the first or second non-dominant path) is found, wherein the maximum error reduction is obtained if the path allocated an extra (or additional) bit. Hence, $$k = \operatorname*{argmax}_n [D_n(R_n) - D_n(R_n + 1)]. \text{ Let } R_k = R_k + 1,$$

$$R_{allocated} = R_{allocated} + 1$$

Next, the preceding step is repeated until $R_{allocated} = R_{total}$.

In practice, since the size of the codebook generated, as described above, is limited, there is a limit for the number of bits that can be allocated to quantize each non-dominant path. Let $R_{n,max}$ denote the maximum possible number of bits that can be allocated to the n:th non-dominant path. Below, it is described how to find an optimal bit-allocation by trimming one bit at a time.

In an initialization step, the following variable are initialized according to $R_n = R_{n,max}$ for all n=1, 2, Λ, N, and $$R_{allocated} = \sum_{n=1}^{N} R_{n,max} > R_{total}.$$

In a step, the path that if removed one bit, the minimum error increase is obtained, is found. Hence, $$k = \operatorname*{argmax}_n [D_n(R_n - 1) - D_n(R_n)] \text{ with } R_k = R_k - 1 \text{ and}$$

$$R_{allocated} = R_{allocated} - 1$$

Next, the preceding step is repeated until $R_{allocated} = R_{total}$.

Figure 11:
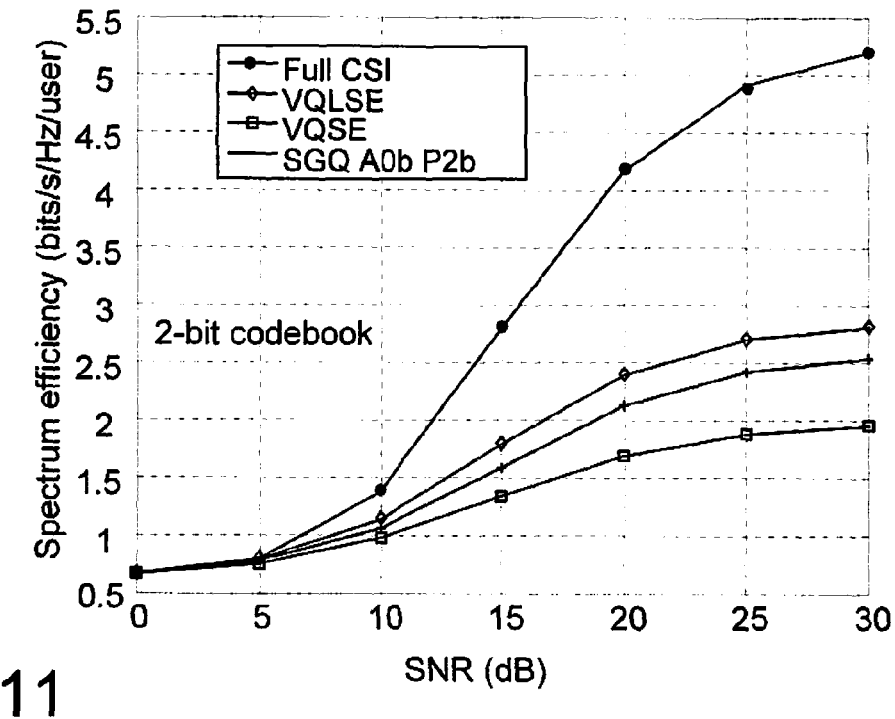
FIG. 11 shows another diagram, in which spectrum efficiency of a 2-bit codebook is plotted as a function of signal to noise ratio for a plurality of methods for providing channel state information feedback.
Figure 12:
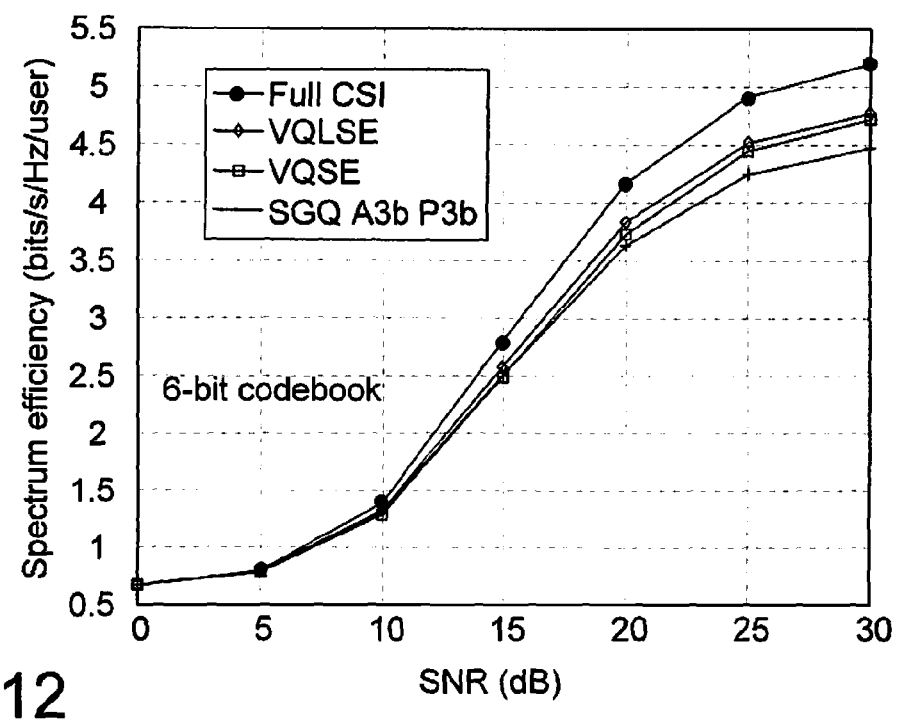
FIG. 12 shows a further diagram, in which spectrum efficiency of a 6-bit codebook is plotted as a function of signal to noise ratio for a plurality of methods for providing channel state information feedback.

With reference to FIG. 11 and FIG. 12, simulation results for a system with three single-antenna radio network nodes and three single-antenna mobile terminals are shown. In FIGS. 11 and 12, there are shown graphs indicating spectrum efficiency as a function of signal to noise ratio (SNR) for different channel response ratio quantization methods (VQLSE, VQSE and SGQ) and a graph indicating spectrum efficiency as a function of signal to noise ratio (SNR) for the case quantization of the channel response ratio(s) has been performed (Full CSI). Vector quantization with the commonly-used distortion measure Squared Error (SE), $d(x,\hat{x}) = \|x - \hat{x}\|^2$, where "$\|\cdot\|$" is the Frobenius norm of a vector, is named VQSE. Log squared error (as proposed by the present inventors) is a better measure than squared error, since the channel quantization error $\|x - \hat{x}\|^2$ results in interference, which in turn impacts the channel capacity with its logarithm form (at least in high Signal-to-Interference-plus-Noise Ratio (SINR) and interference-limited regime). Shape Gain Quantization, SGQ, in FIGS. 11 and 12, quantizes the magnitude and phase of $r_w$ independently. A0b P2b denotes amplitude 0 bit phase 2 bits. From the Figures, it may be seen that the method for providing channel state information feedback by using the present codebook outperforms some other methods for providing channel state information feedback.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method implemented by a user equipment in a coordinated multi-point transmission radio communication system, including a first radio network node and a second radio network node, the coordinated multi-point transmission radio communication system comprising a dominant path between said user equipment and said first radio network node and at least one first non-dominant path between said user equipment and the second radio network node, the method comprising:

estimating a dominant path channel response based on a first set of channel estimation symbols received from the first radio network node;

estimating a first non-dominant path channel response based on a second set of channel estimation symbols received from the second radio network node;

determining a ratio of said first non-dominant path channel response to the dominant path channel response;

combining real and imaginary parts of said determined ratio into a vector; and quantizing the vector by means of a codebook comprising a plurality of reproduction coefficients generated by executing an iterative algorithm while applying a distortion measure of $d(x,\hat{x})=\log(1+\|x-\hat{x}\|^2)$ where x represents an input signal and $\hat{x}$ represents a signal in response to the input signal.

2. The method according to claim 1, wherein the coordinated multi-point transmission radio communication system further includes a third radio network node and further comprises a second non-dominant path between the user equipment and the third radio network node, the method further comprising:

estimating a second non-dominant path channel response based on a third set of channel estimation symbols received from the third radio network node;

determining at least two ratios of said at least one first non-dominant path channel response and the second non-dominant path channel response to the dominant path channel response; and selecting at least two codebooks for quantization of said at least two ratios based on statistic properties of said at least one second and third non-dominant path.

3. The method according to claim 1, wherein the channel response comprises at least one of fast fading and path gain.

4. The method according to claim 1, further comprising sending the quantized vector as channel state information feedback to a further network node comprised in the coordinated multi-point transmission radio communication system.

5. A user equipment in a coordinated multi-point transmission radio communication system, including a first radio network node and a second radio network node, the coordinated multi-point transmission radio communication system comprising a dominant path between said user equipment and said first radio network node and at least one first non-dominant path between said user equipment and the second radio network node, the user equipment comprising:

a receiving unit configured to receive a first set of channel estimation symbols from the first radio network node and to receive a second set of channel estimation symbols from the second radio network node;

a processing unit configured to:
  estimate a dominant path channel response based on the first set of channel estimation symbols;
  estimate a first non-dominant path channel response based on the second set of channel estimation symbols;
  determine a ratio of said first non-dominant path channel response to the dominant path channel response;
  combine real and imaginary parts of said determined ratio into a vector; and
  quantize the vector by means of a codebook comprising a plurality of reproduction coefficients generated by executing an iterative algorithm while applying a distortion measure of $d(x,\hat{x})=\log(1+\|x-\hat{x}\|^2)$ where x represents an input signal and $\hat{x}$ represents a signal in response to the input signal.

6. A method for generating reproduction coefficients of a codebook, wherein the codebook is usable in a channel state information feedback procedure of a coordinated multi-point transmission radio communication system, the method comprising:

applying a distortion measure of $d(x,\hat{x})=\log(1+\|x-\hat{x}\|^2)$, where x represents an input signal and $\hat{x}$ represents a signal in response to the input signal; and executing an iterative algorithm while applying the distortion measure to generate the reproduction coefficients of the codebook.

7. The method according to claim 6, wherein the iterative algorithm comprises one of a Linde-Buzo-Gray algorithm and a Lloyd Max algorithm.

8. The method according to claim 6, wherein the generated reproduction coefficients comprise a predetermined number of bits for different codebooks.

9. An apparatus for generating reproduction coefficients of a codebook, wherein the codebook is usable in a channel state information feedback procedure of a coordinated multi-point transmission radio communication system, the apparatus comprising:

an input unit configured to receive an input signal x;

a processing unit configured to execute an iterative algorithm, while applying a distortion measure of $d(x,\hat{x})=\log(1+\|x-\hat{x}\|^2)$, where $\hat{x}$ represents a signal in response to the input signal, thereby generating the reproduction coefficients of the codebook.

10. A method implemented by a user equipment for providing feedback in a coordinated multi-point transmission radio communication system including a further network node and first, second, and third radio network nodes managed by the further network node, wherein a dominant path exists between the user equipment and the first radio network node and first and second non-dominant paths exist between the user equipment and the respective second and third radio network nodes, the method comprising:

receiving a first set of channel estimation symbols from the first radio network node, a second set of channel estimation symbols from the second radio network node, and a third set of channel estimation symbols from the third radio network node;

estimating a dominant path channel response based on the first set of channel estimation symbols;

estimating a first non-dominant path channel response based on the second set of channel estimation symbols;

estimating a second non-dominant path channel response based on the third set of channel estimation symbols;

determining a first ratio of the first non-dominant path channel response to the dominant channel path response, and a second ratio of the second non-dominant path channel response to the dominant channel path response;

selecting a codebook for each of said first and second ratios based on statistic properties of said first and second non-dominant paths;

wherein reproduction coefficients of the selected codebooks are generated by executing an iterative algorithm while applying a distortion measure of $d(x,\hat{x})=\log(1+\|x-\hat{x}\|^2)$ where x represents an input signal and $\hat{x}$ represents a signal in response to the input signal;

quantizing the first and second ratios based on the selected codebooks to generate channel state information feedback; and sending the channel state information feedback to the further network node.

11. The method according to claim 10, wherein a quantizing error associated with the channel state information feedback is based on statistic properties of at least one of said first and second non-dominant paths over a period of time.

12. The method according to claim 10, further comprising sending information about the selected codebooks to the further network node.

13. The method according to claim 10, further comprising sending at least one index indicating at least one of the selected codebooks to the further network node.

14. The method according to claim 13, wherein sending at least one index comprises sending at least one index less frequently than sending the channel state information feedback.

15. A user equipment configured to provide feedback in a coordinated multi-point transmission radio communication system including a further network node and first, second, and third radio network nodes managed by the further network node, wherein a dominant path exists between the user equipment and the first radio network node and first and second non-dominant paths exist between the user equipment and the respective second and third radio network nodes, the user equipment comprising:
- a receiving unit configured to receive a first set of channel estimation symbols from the first radio network node, and to receive second and third sets of channel estimation symbols from the second and third radio network nodes, respectively;
- a processing unit configured to:
  estimating a dominant path channel response based on the first set of channel estimation symbols;
  estimate a first non-dominant path channel response based on the second set of channel estimation symbols;
  estimate a second non-dominant path channel response based on the third set of channel estimation symbols;
  determine a first ratio of the first non-dominant path channel response to the dominant channel path response, and a second ratio of the second non-dominant path channel response to the dominant channel path response;
  select a codebook for each of said first and second ratios based on statistic properties of said first and second non-dominant paths;
  wherein reproduction coefficients of the selected codebooks are generated by executing an iterative algorithm while applying a distortion measure of $d(x,\hat{x})=\log(1+\|x-\hat{x}\|^2)$ where x represents an input signal and $\hat{x}$ represents a signal in response to the input signal; and
  quantize the first and second ratios using the selected codebooks to generate channel state information feedback; and
- a sending unit configured to send the channel state information feedback to the further network node.

* * * * *